US009156165B2

(12) United States Patent
Ponulak (10) Patent No.: US 9,156,165 B2
(45) Date of Patent: Oct. 13, 2015

(54) ADAPTIVE CRITIC APPARATUS AND METHODS

(75) Inventor: Filip Ponulak, San Diego, CA (US)

(73) Assignee: Brain Corporation, San Diego, CA (US)

(*) Notice: Subject to any disclaimer, the term of this patent is extended or adjusted under 35 U.S.C. 154(b) by 798 days.

(21) Appl. No.: 13/238,932

(22) Filed: Sep. 21, 2011

(65) Prior Publication Data

US 2013/0073080 A1    Mar. 21, 2013

(51) Int. Cl.
*G06F 15/18* (2006.01)
*B25J 9/16* (2006.01)
*G05B 13/02* (2006.01)
*G06N 99/00* (2010.01)

(52) U.S. Cl.
CPC ........... *B25J 9/1635* (2013.01); *G05B 13/0265* (2013.01); *G06N 99/005* (2013.01)

(58) Field of Classification Search
None
See application file for complete search history.

(56) References Cited

U.S. PATENT DOCUMENTS

| 5,063,603 | A | 11/1991 | Burt |
| 5,092,343 | A | 3/1992 | Spitzer et al. |
| 5,245,672 | A | 9/1993 | Wilson et al. |
| 5,355,435 | A | 10/1994 | DeYong et al. |
| 5,388,186 | A | 2/1995 | Bose |
| 5,408,588 | A | 4/1995 | Ulug |
| 5,467,428 | A | 11/1995 | Ulug |
| 5,638,359 | A | 6/1997 | Peltola |
| 5,673,367 | A | 9/1997 | Buckley |
| 5,875,108 | A | 2/1999 | Hoffberg |
| 6,009,418 | A | 12/1999 | Cooper |
| 6,014,653 | A | 1/2000 | Thaler |
| 6,169,981 | B1* | 1/2001 | Werbos .................. 706/23 |
| 6,363,369 | B1 | 3/2002 | Liaw et al. |
| 6,458,157 | B1 | 10/2002 | Suaning |
| 6,532,454 | B1* | 3/2003 | Werbos .................. 706/14 |
| 6,545,705 | B1 | 4/2003 | Sigel |
| 6,545,708 | B1 | 4/2003 | Tamayama |
| 6,546,291 | B2 | 4/2003 | Merfeld |
| 6,581,046 | B1 | 6/2003 | Ahissar |

(Continued)

FOREIGN PATENT DOCUMENTS

| CN | 102226740 A | 10/2011 |
| EP | 1089436 A2 | 4/2001 |

(Continued)

OTHER PUBLICATIONS

Prokhorov, Danil V., and Donald C. Wunsch. "Adaptive critic designs." Neural Networks, IEEE Transactions on 8.5 (1997): 997-1007.*

(Continued)

*Primary Examiner* — Kakali Chaki
*Assistant Examiner* — Daniel Pellett
(74) *Attorney, Agent, or Firm* — Gazdzinski & Associates PC (57) ABSTRACT

A control apparatus and methods using context-dependent difference learning for controlling e.g., a plant. In one embodiment, the apparatus includes an actor module and a critic module. The actor module provides a control signal for the plant. The actor module is subject to adaptation, which is performed to optimize control strategy of the actor. The adaptation is based upon the reinforcement signal provided by the critic module. The reinforcement signal is calculated based on the comparison of a present control performance signal observed for a certain context signal, with a control performance signal observed for the same context in the past.

20 Claims, 7 Drawing Sheets

(56) References Cited

U.S. PATENT DOCUMENTS

| | | | |
|---|---|---|---|
| 6,601,049 B1 | 7/2003 | Cooper | |
| 6,643,627 B2 | 11/2003 | Liaw et al. | |
| 6,917,925 B2 * | 7/2005 | Berenji et al. | 706/10 |
| 7,395,251 B2 | 7/2008 | Linsker | |
| 7,426,501 B2 | 9/2008 | Nugent | |
| 7,672,920 B2 | 3/2010 | Ito et al. | |
| 7,849,030 B2 | 12/2010 | Ellingsworth | |
| 8,015,130 B2 | 9/2011 | Matsugu | |
| 8,103,602 B2 | 1/2012 | Izhikevich | |
| 8,315,305 B2 | 11/2012 | Petre | |
| 8,467,623 B2 | 6/2013 | Izhikevich | |
| 2002/0038294 A1 | 3/2002 | Matsugu | |
| 2003/0050903 A1 | 3/2003 | Liaw et al. | |
| 2004/0193670 A1 | 9/2004 | Langan | |
| 2005/0015351 A1 | 1/2005 | Nugent | |
| 2005/0036649 A1 | 2/2005 | Yokono | |
| 2005/0283450 A1 | 12/2005 | Matsugu | |
| 2006/0161218 A1 | 7/2006 | Danilov | |
| 2007/0022068 A1 | 1/2007 | Linkser | |
| 2007/0176643 A1 | 8/2007 | Nugent | |
| 2007/0208678 A1 | 9/2007 | Matsugu | |
| 2008/0024345 A1 | 1/2008 | Watson | |
| 2009/0043722 A1 | 2/2009 | Nugent | |
| 2009/0287624 A1 | 11/2009 | Rouat | |
| 2010/0086171 A1 | 4/2010 | Lapstun | |
| 2010/0166320 A1 | 7/2010 | Paquier | |
| 2010/0198765 A1 | 8/2010 | Fiorillo | |
| 2011/0016071 A1 | 1/2011 | Guillen | |
| 2011/0119214 A1 | 5/2011 | Breitwisch | |
| 2011/0119215 A1 | 5/2011 | Elmegreen | |
| 2011/0160741 A1 | 6/2011 | Asano | |
| 2012/0011090 A1 | 1/2012 | Tang | |
| 2012/0011093 A1 | 1/2012 | Aparin | |
| 2012/0036099 A1 | 2/2012 | Venkatraman | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073080 A1 | 3/2013 | Ponulak | |
| 2013/0073491 A1 | 3/2013 | Izhikevich | |
| 2013/0073496 A1 | 3/2013 | Szatmary | |
| 2013/0073500 A1 | 3/2013 | Szatmary | |
| 2013/0151448 A1 | 6/2013 | Ponulak | |
| 2013/0151449 A1 | 6/2013 | Ponulak | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325776 A1 | 12/2013 | Ponulak et al. | |
| 2014/0025613 A1 | 1/2014 | Ponulak | |
| 2014/0032458 A1 | 1/2014 | Sinyavskiy | |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 A2 | 7/2008 |
| WO | 2008132066 A1 | 11/2008 |

OTHER PUBLICATIONS

Bertsekas, Dimitri P., and Dimitri P. Bertsekas. Dynamic programming and optimal control. vol. 1. No. 2. Belmont, MA: Athena Scientific, 1995.*

White, David Ashley, and Donald A. Sofge, eds. Handbook of Intelligent Control: Neural, Fuzzy, and Adaptative Approaches. Van Nostrand Reinhold Company, 1992.*

Widrow, Bernard, Narendra K. Gupta, and Sidhartha Maitra. "Punish/reward: Learning with a critic in adaptive threshold systems." Systems, Man and Cybernetics, IEEE Transactions on 5 (1973): 455-465.*

Prokhorov, Danil V., and Lee A. Feldkamp. "Primitive adaptive critics." Neural Networks, 1997., International Conference on. vol. 4. IEEE, 1997.*

Lin, Long-Ji. "Self-improving reactive agents based on reinforcement learning, planning and teaching." Machine learning 8.3-4 (1992): 293-321.*

Kaelbling, Leslie Pack, Michael L. Littman, and Andrew W. Moore. "Reinforcement learning: A survey." arXiv preprint cs/9605103 (1996).*

Bertsekas, Dimitri P. "Approximate dynamic programming." (2011).*

Hanselmann, Thomas, Lyle Noakes, and Anthony Zaknich. "Continuous-time adaptive critics." Neural Networks, IEEE Transactions on 18.3 (2007): 631-647.*

Govindhasamy, James J., Sean F. McLoone, and George W. Irwin. "Sequential learning for adaptive critic design: An industrial control application." Machine Learning for Signal Processing, 2005 IEEE Workshop on. IEEE, 2005.*

Bennett, M.R., (1999), The early history of the synapse: from Plato to Sherrington. *Brain Res. Bull.*, 50(2): 95-118.

Fremaux, N. et al. (2010), *Functional requirements for Reward-Modulated Spike-Timing Dependent Plasticity*, J. a/Neuroscience, 30(4):13326-13337.

Gerstner W. and Kistler W. (2002) *Spiking Neuron Models. Single Neurons, Populations, Plasticity*, Cambridge University Press.

"In search of the artificial retina" [online], *Vision Systems Design*, Apr. 1, 2007.

Izhikevich. E. (2007), *Solving the Distal Reward Problem through Linkage of STDP and Dopamine Signaling*, Cerebral Cortex, 17, 2443-2452.

Kenji Doya (2000), *Reinforcement Learning in Continuous Time and Space*, Neural Computation, 12:1, 219-245.

Klute, G.K., Czerniecki, J.M., and Hannaford, B. (2002). *Artificial Muscles: Actuators for Biorobotic Systems*, The International Journal 0./ Robotics Research 21 :295-309.

Lendek Z.S., Babuska R., and De Schutter B. (2006) *State Estimation under Uncertainly: A Survey*. Technical report 06-004, Delft Center for Systems and Control Delft University of Technology.

Legenstein, R., et al. (2008), *A learning theory for reward-modulated spike timing-dependent plasticity with application to biofeedback*. PLoS Computational Biology, 4(10): 1-27.

Nikolic, K., San Segundo Bello D., Delbruck T, Liu, S., and Roska, B. *High-sensitivity silicon retina for robotics and prosthetics*, 2011.

Ponulak, F., (2005). *ReSuMe—New supervised learning method for Spiking Neural Networks*. Technical Report, Institute of Control and Information Engineering, Poznan University of Technology.

Ponulak, F., Kasinski, A., (2010) *Supervised Learning in Spiking Neural Networks with ReSuMe: Sequence Learning, Classification and Spike-Shifting*. Neural Comp., 22(2): 467-510.

R.S. Sutton and A.G. Barto (1998), *Reinforcement Learning, an Introduction*. MIT Press.

Schreiber S .et al. (2003), *A new correlation-based measure of spike timing reliability*. Neurocomputing, 52-54, 925-931.

Sutton R.S. (1988). *Learning to predict by the methods of temporal differences*, Machine Learning 3(1), 9-44.

Stein, R.B., (1967), *Some models of neural variability*. Biophys. J., 7: 37-68.

Werbos P.J. (1992), or Prokhorov D.V and Wunsch D.C. (1997) *Adaptive Critic Designs*, IEEE Trans Neural Networks, vol. 8, No. 5, pp. 997-1007.

White, D. and Sofge, D. (Eds.) (1992) *Handbook of Intelligent Control: Neural, Fuzzy and Adaptive Approaches*. Van Nostrand Reinhold, New York.

Widrow B, Hoff. M.E. (1960) *Adaptive Switching Circuits*. IRE WESCON Convention Record 4: 96-104.

*Supervised Learning in Spiking Neural Networks with ReSuMe Method*. Filip Ponulak, Doctoral Dissertation Poznan, Poland, 2006.

*Reinforcement Learning Through Modulation of Spike-Timing-Dependent Synaptic Plasticity*, Razvan V. Florian Neural Computation 19, 1468-1502 (2007) Massachusetts Institute of Technology.

*Reinforcement Learning in Intelligent Control: A Biologically-Inspired Approach to the Re/earning Problem*, Brendan D'Cruz May 1998.

(56) References Cited

OTHER PUBLICATIONS

*Phenomenological models of synaptic plasticity based on spike timing*, Abigail Morrison, Markus Diesmann, Wulfram Gerstner Received: Jan. 16, 2008 / Accepted: Apr. 9, 2008 © The Author(s) 2008.
Alexandros Bouganis and Murray Shanahan, "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.
Xiaohui Xie and H. Sebastian Seung, "Learning in neural networks by reinforcement of irregular spiking", Physical Review E, vol. 69, letter 041909, 2004, pp. 1-10.
Helene Paugam-Moisy and Sander Bohte, "Computing with Spiking Neuron Networks" from Eds. {G. Rozenberg, T. Back, J. Kok} of Handbook of Natural Computing, publshied by Springer Verlag, 2009, pp. 1-47.
Floreano et al. "Neuroevolution: From Architectures to learning" Evol. Intel. Jan. 2008 1:47-62 (retrieved online on Apr. 24, 2013 from http://infoscience.epfl.ch/record/112676/files/FloreanoDuerrMattiussi2008.pdf).
PCT International Search Report for International Application PCT/US2013/060352 dated Jan. 16, 2014.
Floreano et al., 'Neuroevolution: from architectures to learning' Evol. Intel. Jan. 2008 1:47-62, [retrieved Dec. 30, 2013] [retrieved online from URL:<http://inforscience.epfl.ch/record/112676/files/FloreanoDuerrMattiussi2008.p df>.
Khotanzad, 'Classification of invariant image representations using a neural network' IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep—rep1&type—pdf.
PCT International Search Report and Written Opinion for International Application No. PCT/US2013/044124 dated Sep. 12, 2013.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.egi/4620/ps/1774.pdf>.
Sinyavskiy et al. 'Reinforcement learning of a spiking neural network in the task of control of an agent in a virtual discrete environment' Rus. J. Nonlin. Dyn., 2011, vol. 7, No. 4 (Mobile Robots), pp. 859-875, chapters 1-8 (Russian Article with English Abstract).
Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepages,cwi.n11-sbolltedmblica6ond)hdthesislxif>.
Brette et al., Brian: a simple and flexible simulator for spiking neural networks, The Neuromorphic Engineer, Jul. 1, 2009, pp. 1-4, doi: 10.2417/1200906.1659.
Cuntz et al., 'One Rule to Grow Them All: A General Theory of Neuronal Branching and Its Paractical Application' PLoS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Fidjeland et al., Accelerated Simulation of Spiking Neural Networks Using GPUs [online],2010 [retrieved on Jun. 15, 2013], Retrieved from the Internet: URL:http:// ieeexplore.ieee.org/xpls/abs_all.jsp?ammber=5596678&tag=1.
Gewaltig et al., 'NEST (Neural Simulation Tool)', Scholarpedia. 2007, pp. 1-15, 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http:// www.neurophys.biomedicale.univparis5. fr/-graham/surf-hippo-files/Surf-Hippo% 20Reference%20Manual.pdf, Mar. 2002, pp. 1-128.
Izhikevich, 'Polychronization: Computation with Spikes', Neural Computation, 25, 2006, 18, 245-282.
Izhikevich, 'Simple Model of Spiking Neurons', IEEE Transactions on Neural Networks, vol. 14, No. 6, Nov. 2003, pp. 1569-1572.
Izhikevich et al., 'Relating STDP to BCM', Neural Computation (2003) 15, 1511-1523.
Karbowski et al., 'Multispikes and Synchronization in a Large Neural Network with Temporal Delays', Neural Computation 12, 1573-1606 (2000).
Laurent, 'The Neural Network Query Language (NNQL) Reference' [retrieved on Nov. 12, 2013]. Retrieved from the Internet: <URL'https://code.google.com/p/ nnql/issues/detail?id-1>.
Laurent, 'Issue 1—nnql—Refactor Nucleus into its own file—Neural Network Query Language' [retrieved on Nov. 12, 2013]. Retrieved from the Internet: URL:https:// code.google.com/p/nnql/issues/detail?id=1.
Nichols, A Re configurable Computing Architecture for Implementing Artificial Neural Networks on FPGA, Master's Thesis, The University of Guelph, 2003, pp. 1-235.
Simulink.RTM. model [online], [Retrieved on Dec. 10, 2013] Retrieved from URL: http://www.mathworks.com/products/simulink/index.html>.
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.10008 79#>.
PCT International Search Report for PCT/US2013/052136 dated Nov. 30, 2013.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Seung, H. "Learning in spiking neural networks by reinforcement of stochastic synaptic transmission." Neuron vol. 40 No. 6 (2003): pp. 1063-1073.
Weber, C. et al. 'Robot docking with neural vision and reinforcement.' Knowledge-Based Systems vol. 17 No. 2 (2004): pp. 165-172.
Baras, D. et al. "Reinforcement learning, spike-time-dependent plasticity, and the BCM rule." Neural Computation vol. 19 No. 8 (2007): pp. 2245-2279.
de Queiroz, M. et al. "Reinforcement learning of a simple control task using the spike response model." Neurocomputing vol. 70 No. 1 (2006): pp. 14-20.
Aleksandrov (1968), Stochastic optimization, Engineering Cybernetics, 5, 11-16.
Amari (1998), Why natural gradient?, Acoustics, Speech and Signal Processing, (pp. 1213-1216). Seattle, WA, USA.

(56) References Cited

OTHER PUBLICATIONS

Bartlett et al., (2000) "A Biologically Plausible and Locally Optimal Learning Algorithm for Spiking Neurons" Retrieved from http://arp.anu.edu.au/ftp/papers/ jon/brains.pdf.gz.

Baxter et al. (2000.). Direct gradient-based reinforcement learning. In Proceedings of the International Symposium on Circuits.

Bohte et al., "A Computational Theory of Spike-Timing Dependent Plasticity: Achieving Robust Neural Responses via Conditional Entropy Minimization" 2004.

Bohte, (2000). SpikeProp: backpropagation for networks of spiking neurons. In Proceedings of ESANN'2000, (pp. 419-424).

Booij (2005, 6). A Gradient Descent Rule for Spiking Neurons Emitting Multiple Spikes. Information Processing Letters n. 6, v.95, 552-558.

Breiman et al., "Random Forests" 33pgs, Jan. 2001.

Capel, "Random Forests and Ferns" LPAC, Jan. 11, 2012, 40 pgs.

El-Laithy (2011), A reinforcement learning framework for spiking networks with dynamic synapses, Comput Intell Neurosci.

Fletcher (1987), Practical methods of optimization, New York, NY: Wiley-Interscience.

Florian (2005), A reinforcement learning algorithm for spiking neural networks SYNASC '05 Proceedings of the Seventh International Symposium on Symbolic and Numeric Algorithms for Scientific Computing.

Fremaux et al., "Functional Requirements for Reward-Modulated Spike-Timing-Dependent Plasticity", The Journal of Neuroscience, Oct. 6, 2010, 30 (40):13326-13337.

Fu (2005) Stochastic Gradient Estimation, Technical Research Report.

Fu (2008), What You Should Know About Simulation and Derivatives Naval Research Logistics, vol. 55, No. 8, 723-736.

Fyff, et al., (2007), Reinforcement Learning Reward Functions for Unsupervised Learning, ISNN '07 Proceedings of the 4th international symposium on Neural Networks: Advances in Neural Networks.

Gerstner (2002), Spiking neuron models: single neurons, populations, plasticity, Cambridge, U.K.: Cambridge University Press.

Glynn (1995), Likelihood ratio gradient estimation for regenerative stochastic recursions, Advances in Applied Probability. 27, 4, 1019-1053.

Ho, "Random Decision Forests" Int'l Conf. Document Analysis and Recognition, 1995, 5 pgs.

Izhikevich (2007), Solving the distal reward problem through linkage of STDP and dopamine signaling, Cerebral Cortex, vol. 17, pp. 2443-2452.

Kalal et al. "Online learning of robust object detectors during unstable tracking" published on 3rd On-line Learning for Computer Vision Workshop 2009, Kyoto, Japan, IEEE CS.

Kiefer (1952), Stochastic Estimation of the Maximum of a Regression Function, Annals of Mathematical Statistics 23, #3, 462-466.

Klampfl (2009), Spiking neurons can learn to solve information bottleneck problems and extract independent components, Neural Computation, 21(4), pp. 911-959.

Kleijnen et al., Optimization and sensitivity analysis of computer simulation models by the score function method Invited Review European Journal of Operational Research, Mar. 1995.

Larochelle et al., (2009), Exploring Strategies for Training Deep Neural Networks, J. of Machine Learning Research, v. 10, pp. 1-40.

Ojala et al., "Performance Evaluation of Texture Measures with Classification Based on Kullback Discrimination of Distributions" 1994 IEEE, pp. 582-585.

Ozuysal et al., "Fast Keypoint Recognition in Ten Lines of Code" CVPR 2007.

Ozuysal et al., "Fast Keypoint Recognition Using Random Ferns" IEEE Transactions on Pattern Analysis and Machine Intelligence, vol. 32, No. 3, Mar. 2010, pp. 448-461.

Pfister (2003), Optimal Hebbian Learning: A Probabilistic Point of View, in ICANN Proceedings. Springer, pp. 92-98.

Pfister (2006), Optimal Spike-Timing Dependent Plasticity for Precise Action Potential Firing in Supervised Learning, Neural computation ISSN 0899-7667, 18-6.

Reiman et al. (1989). Sensitivity analysis for simulations via likelihood ratios. Oper Res 37, 830-844.

Robbins (1951), A Stochastic Approximation Method, Annals of Mathematical Statistics 22, #3, 400-407.

Rosenstein et al., (2002), Supervised learning combined with an actor-critic architecture, Technical Report 02-41, Department of Computer Science, University of Massachusetts, Amherst.

Kleijnen et al., "Optimization and sensitivity analysis of computer simulation models by the score function method", Invited Review European Journal of Operational Research, Mar. 1995.

Rumelhart et al., (1986), Learning representations by back-propagating errors, Nature 323 (6088). pp. 533-536.

Rumelhart (1986), Learning internal representations by error propagation, Parallel distributed processing, vol. 1 (pp. 318-362), Cambridge, MA: MIT Press.

Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.

Tishby et al., (1999), The information bottleneck method, In Proceedings of the 37th Annual Allerton Conference on Communication, Control and Computing, B Hajek & RS Sreenivas, eds., pp. 368-377, University of Illinois.

Toyoizumi (2007), Optimality Model of Unsupervised Spike-Timing Dependent Plasticity: Synaptic Memory and Weight Distribution, Neural Computation, 19 (3).

Toyoizumi et al., (2005), Generalized Bienenstock-Cooper-Munro rule for spiking neurons that maximizes information transmission, Proc. Natl. Acad. Sci. USA, 102, (pp. 5239-5244).

Vasilaki et al., "Spike-Based Reinforcement Learning in Continuous State and Action Space: When Policy Gradient Methods Fail" PLoS, vol. 5, Issue 12, Dec. 2009.

Vasilaki, et al., "Learning flexible sensori-motor mappings in a complex network" Biol Cybern (2009) 100:147-158.

Weaver (2001), The Optimal Reward Baseline for Gradient-Based Reinforcement Learning, UA1 01 Proceedings of the 17th Conference in Uncertainty in Artificial Intelligence (pp. 538-545). Morgan Kaufman Publishers.

Weber et al., (2009), Goal-Directed Feature Learning, In: Proc, International Joint Conference on Neural Networks, 3319-3326.

Williams (1992), Simple Statistical Gradient-Following Algorithms for Connectionist Reinforcement Learning, Machine Learning 8, 229-256.

Yi (2009), Stochastic search using the natural gradient, ICML '09 Proceedings of the 26th Annual International Conference on Machine Learning. New York, NY, USA.

Sinyavskiy O, Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

\* cited by examiner

ADAPTIVE CRITIC APPARATUS AND METHODS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention generally relates to intelligent control systems and more particularly in one exemplary aspect to computer apparatus and methods for implementing an adaptive critic within e.g., an adaptive critic framework.

2. Description of Related Art

So-called "intelligent control" is a class of control techniques that utilize various computing approaches from artificial intelligence, including neural networks, Bayesian probability, fuzzy logic, machine learning, evolutionary computation and genetic algorithms (see White, D. and Sofge, D. (Eds.) (1992) *Handbook of Intelligent Control: Neural, Fuzzy and Adaptive Approaches*. Van Nostrand Reinhold, N.Y., incorporated herein by reference in its entirety). Intelligent controllers are finding increasing use today in complex systems control applications, such as for example autonomous robotic apparatus for navigation, perception, reaching, grasping, object manipulation, etc. (see Samad T., (Ed.) (2001) *Perspectives in Control: New Concepts and Applications*," IEEE Press, N.J., incorporated herein by reference in its entirety).

Typically, intelligent controllers need to infer a relationship between the control signals (generated by the controller) and operational consequences upon a controlled apparatus (also referred to as "the plant"), that are described by changes of the plant state. Various learning methods are often used by intelligent controllers in order to approximate such relationships (see White and Sofge discussed supra; and Samad, T. (Ed.) (2001) *Perspectives in Control Engineering*. New York, each incorporated herein by reference in its entirety). By way of example, controllers that are used in tracking applications (such as, for example, robotic arms welding or painting car pieces along a predefined trajectory, mobile robots following predefined paths, etc.), aim to ensure that the plant state follows a desired trajectory (the target state trajectory) as closely as possible. In order to achieve trajectory tracking, the controller modifies control parameters (such as e.g. control gains) aiming to minimize an error between the target plant state (such as, for example, a desired robot configuration) and the actual (observed) plant state (such as, for example, an actual robot configuration) at every time instance. Performance of such controllers is typically quantified either by the magnitude of the tracking error, or by certain monotonic functions of the tracking error that are minimized, corresponding to minimized error between the target and actual state. Such functions are commonly referred to as the performance measures (see Goodwin G. (2001). *Control System Design*. Prentice Hall, incorporated herein by reference in its entirety).

Adaptive critic design (ACD) is a class of adaptive algorithms for intelligent control applications that is suitable for learning in noisy, nonlinear, and non-stationary dynamic systems. A family of ACD algorithms was proposed by Werbos P. J. (1992) in "Approximate dynamic programming for real-time control and neural modeling". *Handbook of Intelligent Control: Neural, Fuzzy and Adaptive Approaches*, White D. A. and Sofge D. A. discussed supra, incorporated herein by reference in its entirety, as an optimization technique.

The ACD methods utilize two parametric blocks, commonly referred to as the controller (or the "actor") and the "critic", as described below with respect to FIG. 1. The actor implements various parameterized control rules and generates control signal. In a typical setup, the critic estimates a function that captures the effect that the control law will have on the control performance over multiple time periods into the future. Depending on this estimate, the critic sends a reinforcement signal to the actor. The actor uses the reinforcement signal to modify its control parameters in order to improve the control rules so as to minimize the performance measure, which is equivalent to minimizing the control errors. More details on various adaptive critic designs can be found in: Werbos P. J. (1992), or Prokhorov D. V and Wunsch D. C. (1997) Adaptive Critic Designs, IEEE Trans Neural Networks, vol. 8, No. 5, pp. 997-1007, each incorporated herein by reference in its entirety.

Figure 1:
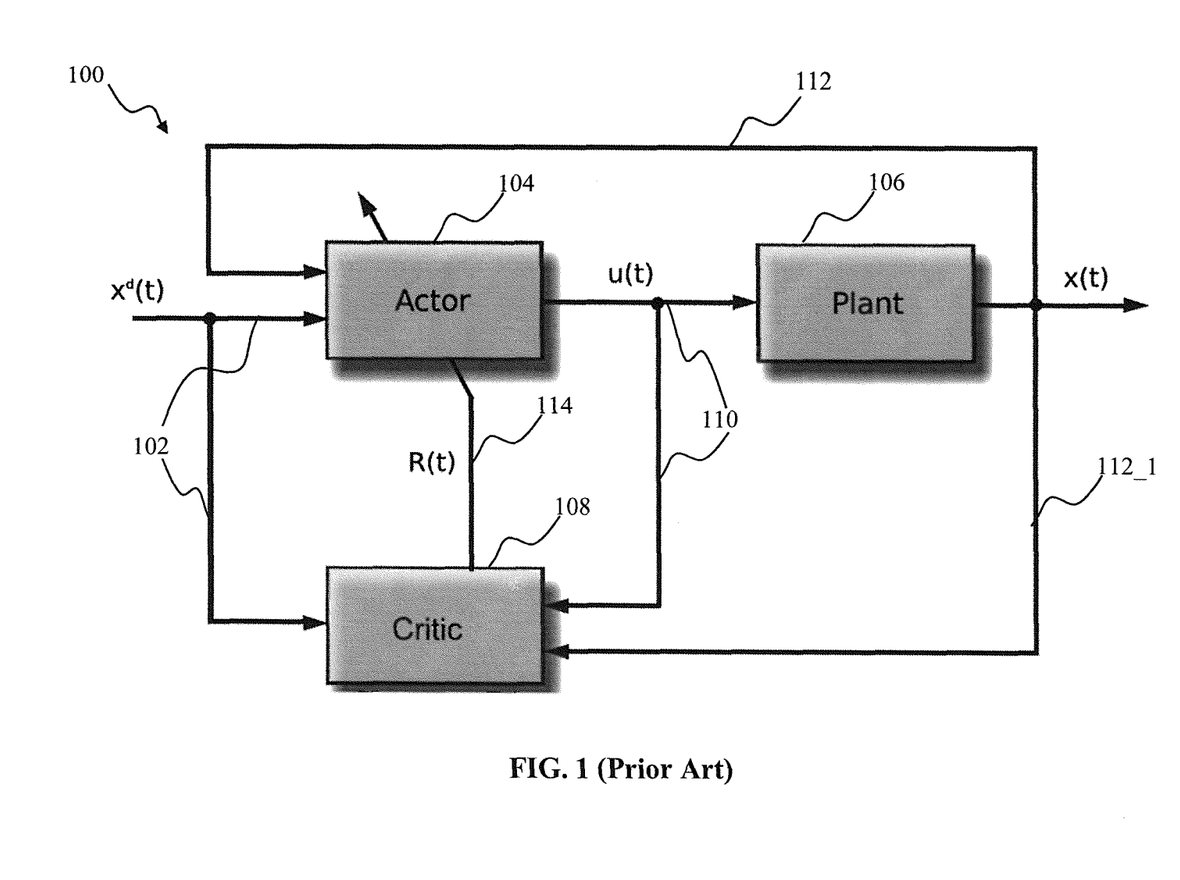
FIG. 1 is a block diagram of typical control system architecture within the adaptive critic design framework according to the prior art.

Referring now to FIG. 1, one typical implementation of the intelligent control apparatus according to prior art is described. The control apparatus 100 comprises a control block comprised of a critic module 108 and an actor block 104, configured to control operation of a plant 106, such as for example a robotic apparatus, a heating ventilation and cooling (HVAC) plant, autonomous vehicle, etc.

The control apparatus 100 is configured to perform control tasks in order to achieve the desired (target) plant state. The control apparatus 100 receives the input desired state signal $x^d(t)$ (such as for example, a reference position of a robot, or a desired temperature for the heating ventilation and air conditioning (HVAC) system), and it produces a current plant state signal x(t). The control apparatus may further comprise a sensing or state estimation apparatus (not shown) that is used to provide a real-time estimate of the actual plant state x(t). The state signal x(t) typically represents full or partial dynamical state of the plant (e.g. current draw, motor position, speed, acceleration, temperature, etc.). In one variant, such as applicable to control applications where the full plant state x(t) is not available directly, various estimation methods may be used for state estimation, such as those described by Lendek Z. S., Babuska R., and De Schutter B. (2006) *State Estimation under Uncertainty*: A Survey. Technical report 06-004, Delft Center for Systems and Control Delft University of Technology, incorporated herein by reference in its entirety.

The control blocks 104, 108 of the control apparatus 100 receive the target state input $x^d(t)$ via the pathways 102 and implement various parameterized control rules in order to generate the control signal u(t) (comprising for example, vehicle speed/direction in a position tracking application; or heater power/fan speed in an HVAC application). The control signal is provided to the plant 106 via the pathway 110, and is configured to move the current plant state x(t) towards the desired state (the target state) $x^d(t)$. The control system 100 implements feedback control (closed-loop control), where the feedback signal x(t) is provided via the signaling lines 112 to the actor block. Alternatively, the control system 100 implements an open-loop control (feed-forward control) and in this case no feedback signal from the plant state to the actor is present. Other implementations exist, such as a combination of open-loop and close-loop control schemes.

The critic block 108 receives the target state input $x^d(t)$ via the pathway 102, the control signal u(t) via the pathway 110, the current state signal x(t) via the pathway 112_1. The critic block 108 is configured to estimate the control performance function V(t), also referred to as the "cost-to-go", that is typically defined for discrete systems as follows:

$$V(t) = \Sigma_{k=0}^{N} \gamma^k J(t+k),\qquad\text{Eqn. 1}$$

where:
γ is a discount factor for finite horizon problems (0<γ<1);
k is the time step index; and
J(t) is the performance measure (also known as a utility function or a local cost) at time t.

For continuous systems, the summation operation in Eqn. 1 is replaced by an integral, and the term $\gamma^k$ is replaced with an exponential function.

The 'cost-to-go' function V(t) captures the effect that the control rules (implemented by the actor block 104) have on the control performance of the control apparatus 100 over a predetermined period of time into the future.

At every time step k, the critic block 108 provides 'guidance' to the actor block 104 via the reinforcement signal R(t) via the pathway 114. For discrete time systems, the reinforcement signal R(t) is typically defined based on the current estimate of the cost function V(t) and a prior estimate of the cost function V(t−1) as follows:

$$R(t) = J(t) + \gamma V(t) - V(t-1) \qquad\text{(Eqn. 2)}$$

where γ is the same constant parameter as in Eqn. 1. More details on this methodology are be found e.g. in R. S. Sutton and A. G. Barto (1998), *Reinforcement Learning—An Introduction.* MIT Press, incorporated herein by reference in its entirety.

For continuous time systems the reinforcement signal is calculated as:

$$R(t) = J(t) - \beta V(t) + \dot{V}(t) \qquad\text{(Eqn. 3)}$$

where □ is a constant parameter and $\dot{V}(t)$ is a time derivative of V(t). More details on the continuous time version are provided in; Kenji Doya (2000), Reinforcement Learning in Continuous Time and Space, Neural Computation, 12:1, 219-245, incorporated herein by reference in its entirety.

Typically, the actor block 104 has no a priori knowledge of the plant 106 dynamic model. Based on the reinforcement signal R(t), the actor block 104 modifies its control parameters (such as for example, gain) in order to generate the control signal u(t) which minimizes the cost-to-go function. For example, in the case of trajectory tracking or set-point control tasks, the minimization of the cost-to-go function corresponds to minimizing the cumulative error between the target and actual plant state, computed as the plant progresses along control trajectory towards the target state.

Figure 2:
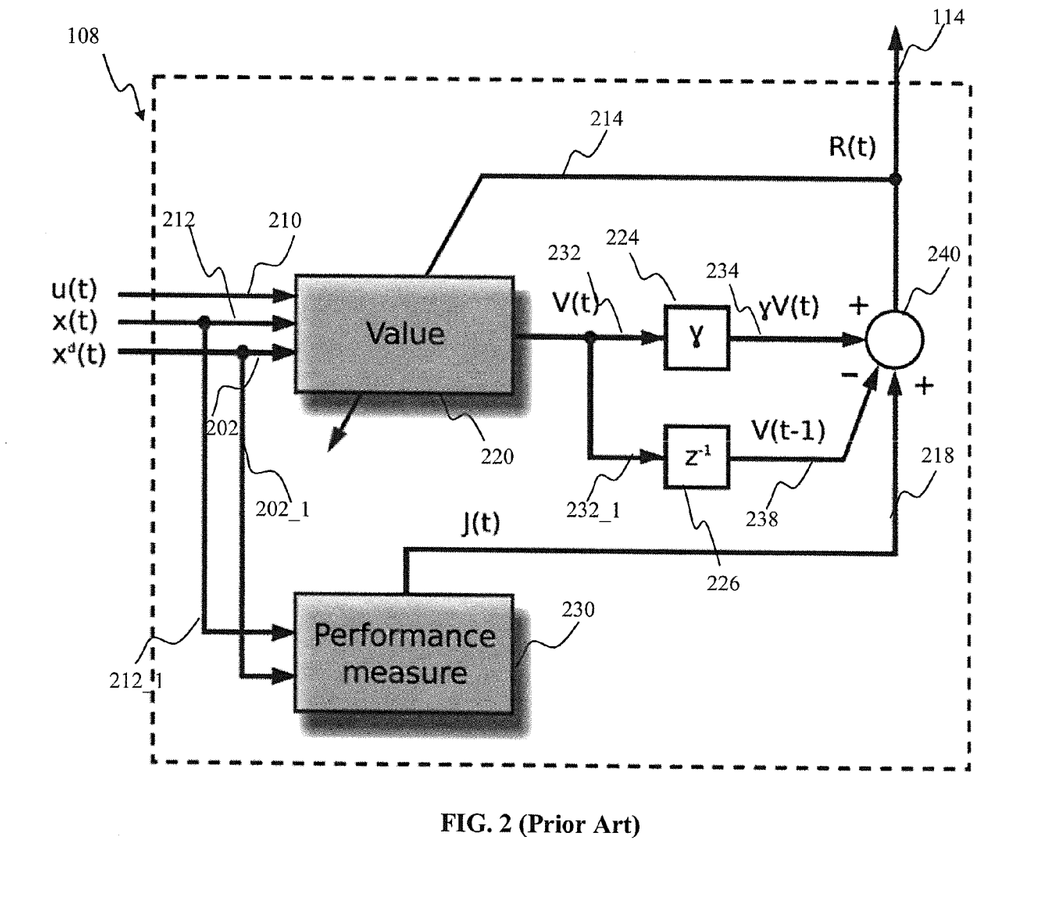
FIG. 2 is a block diagram illustrating one implementation of an adaptive critic of the control apparatus of FIG. 1 for discrete-time control systems according to the prior art.

FIG. 2 illustrates a typical implementation of the critic module 108 for discrete systems in the considered class of control systems (i.e., for set-point control or trajectory tracking tasks) according to the prior art. As shown in FIG. 2, the critic apparatus 108 (denoted by a dashed rectangle) comprises the performance measure block 230, the value estimator block 220, the adjustment block 224, and the delay block 226. The performance measure block 230 calculates the performance measure J(t) given the desired plant state $x^d(t)$ provided through pathway 202_1 and the actual plant state x(t) provided through pathway 212_1.

The value estimator block 220 in FIG. 2 receives the desired plant state signal $x^d(t)$ provided through pathway 202, the actual plant state signal x(t) provided through pathway 212, the control signal u(t) provided through the pathway 210, and reinforcement signal R(t) provided through the pathway 214. At each discrete step of the critic block operation, the value estimator block 220 generates a cost-to-go value signal V(t), based on the received inputs. The reinforcement signal R(t) is used by the value estimator block 220 to modify internal value estimator parameters as described in, e.g., Werbos; White D. A. and Sofge D. A.; or Prokhorov D. V and Wunsch D. C., discussed supra.

The adjustment block 224 (denoted by the γ symbol in FIG. 2 receives the value signal V(t) through the pathway 232 and produces the discounted value signal γV(t). The delay block 226 (denoted by symbol $z^{-1}$ in FIG. 2) receives the value signal V(t) through the pathway 232_1 and produces the value signal delayed by one simulation step, which is denoted as V(t−1) in FIG. 2. The reinforcement signal R(t) is then calculated by the computation block 240 as defined by Eqn. 2., given the performance signal J(t) provided through the pathway 218, the discounted value γV(t) produced by the adjustment block 224 and the delayed value signal V(t−1) provided by the delay block 226.

Figure 2A:
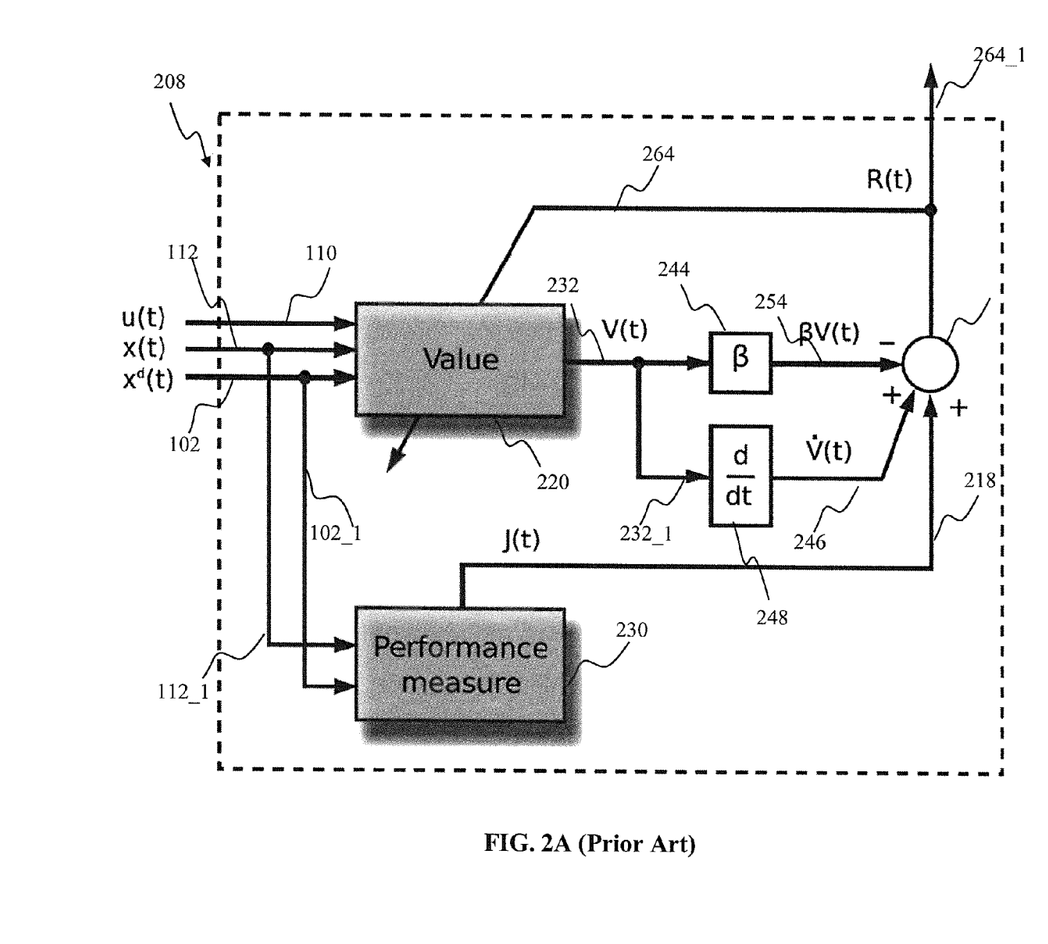
FIG. 2A is a block diagram illustrating one implementation of an adaptive critic of the control apparatus of FIG. 1 for the continuous-time systems according to the prior art.

FIG. 2A illustrates a typical implementation of the critic block for continuous time control systems according to the prior art. As shown in FIG. 2A, the critic apparatus 208 (depicted by a dashed rectangle) comprises the value block 220, the performance measure block 230, the β-block 244 and the derivative block 248 (denoted in the FIG. 2A as d/dt). The value block 220 and the performance measure block 230 receive and produce the same signals and operate similarly to the discrete-time control apparatus described with respect to FIG. 2, supra. The β-block 244 of FIG. 2A receives the value signal V(t) through the pathway 232 and produces the discounted value signal βV(t). The derivative block 248 receives the value signal V(t) through the pathway 232_1, and produces the temporal derivative of the value signal $\dot{V}(t)$. The reinforcement signal R(t) is calculated by the computation block 250 according to the relationship defined in Eqn. 3, given the performance signal J(t) provided through the pathway 218, the discounted value βV(t) produced by the β-block 244 and the temporal derivative $\dot{V}(t)$ of the value signal provided by the derivative block 248.

Traditional ACD approaches, such as those described with respect to FIGS. 2 and 2A, suffer from several shortcomings, such as for example requiring estimates of future performance of the control system. Such predictions invariably are of limited accuracy, and often suffer from the problem of the "curse of dimensionality"; i.e., when system control solutions become unattainable as the number of the variables governing the dynamic system model increases.

Accordingly, there is a salient need for an adaptive critic design apparatus and associated methods that aim at optimizing control rules without the foregoing limitations; e.g., that are based on the observed present and past control system performance.

SUMMARY OF THE INVENTION

The present invention satisfies the foregoing needs by providing, inter alia, apparatus and methods for intelligent control, including apparatus and methods for implementing critic designs using adaptive learning.

In first aspect of the invention, a computerized control apparatus configured to optimize control of an apparatus e.g., robotic device) is described. In one embodiment, the control apparatus comprises a plant block in communication with the robotic device, the plant block configured to output a current plant state signal, an actor block configured to receive a target plant state signal, a current plant state signal, and a reinforcement signal, and to communicate a control signal to the plant block, and a critic block configured to receive the control signal from the actor block, and to provide the reinforcement signal to the actor block. In one variant, the critic block comprises an interpolator configured to receive the target plant state signal, a present value of the current plant state signal, and a present performance value, and to provide a prior performance value; and a comparator configured to determine the reinforcement signal based at least in part on the past performance value and the present performance value. The present value of the current plant state signal corresponds to a second time instance and the present performance value configured based at least in part on the target plant state signal and the present value of the current plant state signal, and the prior performance value is selected by the interpolator based at least in part on (i) the present value of the current plant state signal being within a first predetermined threshold from a past value of the current plant state signal, the past value of the current plant state signal corresponding to a first time instance, and (ii) the target plant state signal being within a second predetermined threshold from a past value of the target plant state signal, the past value of the target plant state signal corresponding to the first time instance; and In second aspect of the invention, a computerized adaptive critic apparatus is described. In one embodiment, the critic apparatus comprises first logic configured to receive a reference signal and a plant state signal, and second logic configured to provide a reinforcement indication being determined based at least in part on (i) a present value of the plant state signal corresponding to a first time instance, and (ii) a present value of the reference signal corresponding to the first time instance.

In one variant, the reinforcement indication is determined based at least in part on a past performance value corresponding to a second time instance, and a present performance value corresponding to the first time instance, the second time instance preceding the first time instance.

In another variant, the critic apparatus comprises an interpolator block configured to receive the reference signal, the plant state signal, and a first performance value, and to provide a second performance value, the first performance value is associated with the first time instance; and the second performance value is based at least in part on a past control performance, associated with a second time instance, the second time instance preceding the first time instance.

In another variant, the first and second logic comprise a computer readable storage medium having at least one computer program stored thereon, the at least one program being configured to, when executed on a processing device: receive a reference signal and a plant state signal, and provide the reinforcement indication.

In yet another variant, the first and second logic are comprised, at least in part, of gate logic of an integrated circuit.

In a third aspect of the invention, an adaptive apparatus is disclosed. In one embodiment, the adaptive apparatus is adapted for use in a computerized controller, the computerized controller configured to optimize control of a functional apparatus, and the adaptive apparatus comprises: first logic configured to receive at a first time a context value, second logic configured to determine a value of a performance signal of the computerized controller corresponding to the first time, the determination based at least in part on the context value, and third logic configured to provide a reinforcement indication adapted to cause modification of at least one control parameter of the computerized controller, the modification configured to minimize an error value associated with the performance signal, the reinforcement indication is determined based at least in part on the value of the performance signal.

In one variant, the context value comprises a context vector, the reinforcement indication is further determined based at least in part on a past value of the performance signal, the past value associated with a second time preceding the first time, and the past value of the performance signal is determined based at least in part on a match between the context vector and a past context vector corresponding to the second time, the past value of the performance signal is determined based at least in part on a value of the performance signal determined at the second time based on the past context vector.

In another variant, the adaptive apparatus comprises a plant block in communication with the functional apparatus, the plant block configured to provide a plant state to the adaptive apparatus, and an actor block in communication with the plant block and the adaptive apparatus the actor block configured to receive the reinforcement indication, configured to cause modification of at least one control parameter associated with control of the functional apparatus so as to effect optimized control of the functional apparatus. The context value comprises a first value of a reference signal, corresponding to the first time and a first value of the plant state corresponding to the first time, and the past context vector comprises a second value of the reference signal, corresponding to a second time and a second value of the plant state, corresponding to the second time.

In yet another variant, the past value of the performance signal is configured based at least in part on (i) the first value of the plant state being within a first predetermined threshold from the second value of the plant, (ii) the first value of the reference signal being within a second predetermined threshold from the second value of the reference signal, (iii) the value of the performance signal, and (iv) a past value of the performance signal determined at the second time based at least in part on the second value of the reference signal and the second value of the plant state.

In a fourth aspect of the invention, method for computerized intelligent control is disclosed. In one embodiment, the method comprises receiving a first context indicator associated with a first time, determining a first performance value based at least in part on the first context indicator, and providing a reinforcement indication, the reinforcement indication being determined based at least in part on the first performance value, the reinforcement indication further configured to enable modification of at least one control parameter associated with control of a functional apparatus.

In one variant, the modification is configured to reduce at least one error measure associated with control of the functional apparatus, relative to control of the functional apparatus in absence of the reinforcement indication, and the first context indicator comprises a reference state signal and a current state signal, the current state associated with control of the functional apparatus.

In another variant, the reinforcement indication is being determined based at least in part on a past performance value provided by an interpolator block, and the first performance value comprises a teaching signal configured to effect supervised learning of the interpolator block, the teaching signal being determined based at least in part on a parameterized function of at least one of the reference signal the current state signal. The parameterized function is characterized by at least one parameter, and the supervised learning is configured to modify the at least one parameter.

In another variant, the supervised learning comprises online learning effected during operation of the functional apparatus, the function is configured to compute a running mean of a plurality of performance values corresponding to a plurality of time instances and the at least one parameter comprises a number of performance values of the plurality of the performance values used in computing the running mean, and each time instance of the plurality of time instances preceding the first time.

In another aspect of the invention, an adaptive critic-controlled system is disclosed. In one embodiment, the system comprises an adaptive critic apparatus such as that referenced supra, and a controlled apparatus (such as e.g., a robotic device).

All Figures disclosed herein are © Copyright 2011 Brain Corporation. All rights reserved.

DETAILED DESCRIPTION OF THE EXEMPLARY EMBODIMENTS

Exemplary embodiments of the present invention will now be described in detail with reference to the drawings, which are provided as illustrative examples so as to enable those skilled in the art to practice the invention. Notably, the figures and examples provided herein are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Where certain elements of these embodiments can be partially or fully implemented using known components, only those portions of such known components that are necessary for an understanding of the present invention will be described, and detailed descriptions of other portions of such known components will be omitted so as not to obscure the invention.

In the present specification, an embodiment showing a singular component should not be considered limiting; rather, the invention is intended to encompass other embodiments including a plurality of the same component, and vice-versa, unless explicitly stated otherwise herein.

Further, the present invention encompasses present and future known equivalents to the components referred to herein by way of illustration.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "integrated circuit", "chip", and "IC" are meant to refer to an electronic circuit manufactured by the patterned diffusion of trace elements into the surface of a thin substrate of semiconductor material and generally include, without limitation, field programmable gate arrays (e.g., FPGAs), a programmable logic device (PLD), reconfigurable computer fabrics (RCFs), application-specific integrated circuits (ASICs).

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, field programmable gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "state" and "plant state" refer, without limitation, to a set of variables used to describe the full or partial dynamic state of the plant.

Overview

Apparatus and methods for the adaptive critic design directed at optimizing control rules that are based primarily on the observed present and past control system performance are disclosed. This approach advantageously improves control performance of the control apparatus of the invention, compared to the existing ACD solutions. The improvement is due to, in part, the use of the present performance measure, which is a directly observable quantity, and is used as the training target during the adaptive critic training phase.

In one embodiment, the critic apparatus of the invention advantageously generates a reinforcement signal based on the value of the present control performance quantified by the performance measure observed for the certain context, with an estimate of the past control performance value J for the same context. The input context may comprise a vector composed of the plant state and a target plant state trajectory (the desired plant state).

Thus, unlike in the traditional ACDs, the role of the critic of the present invention is to estimate past system performance rather than the future performance. This configuration advantageously facilitates training of the critic apparatus, as described above.

The present invention provides, in one salient aspect, apparatus and methods for implementing an adaptive-critic for intelligent control of a plant within the adaptive critic framework. The described methods aim at minimizing an instantaneous error between the desired plant state and the actual (observed) plant state. The methods and apparatus of the invention are useful for, but are not limited to, a category of trajectory tracking or set-point control tasks.

In a broader sense, the invention provides methods and apparatus for solving a problem of function approximation: given certain inputs to the system, the exemplary embodiments of the invention generate output signals that predict the target output signals.

Detailed Description of Exemplary Embodiments

Detailed descriptions of the various embodiments and variants of the apparatus and methods of the invention are now provided.

Embodiments of the invention may be for example deployed in a hardware and/or software implementation of a computer-controlled system, provided in one or more of a prosthetic device, robotic device and any other specialized apparatus. In one such implementation, an control system may include a processor embodied in an application specific integrated circuit (ASIC), a central processing unit (CPU), a graphics processing unit (GPU), a digital signal processor (DSP) or an application specific processor (ASIP) or other general purpose multiprocessor, which can be adapted or configured for use in an embedded application such as controlling a robotic device. However, it will be appreciated that the invention is in no way limited to the foregoing applications and/or implementations.

Exemplary Critic Apparatus

The present invention provides, in one salient aspect, apparatus and methods for implementing an adaptive-critic apparatus directed at minimizing an instantaneous error between the target state and actual (observed) plant state.

Figure 3:
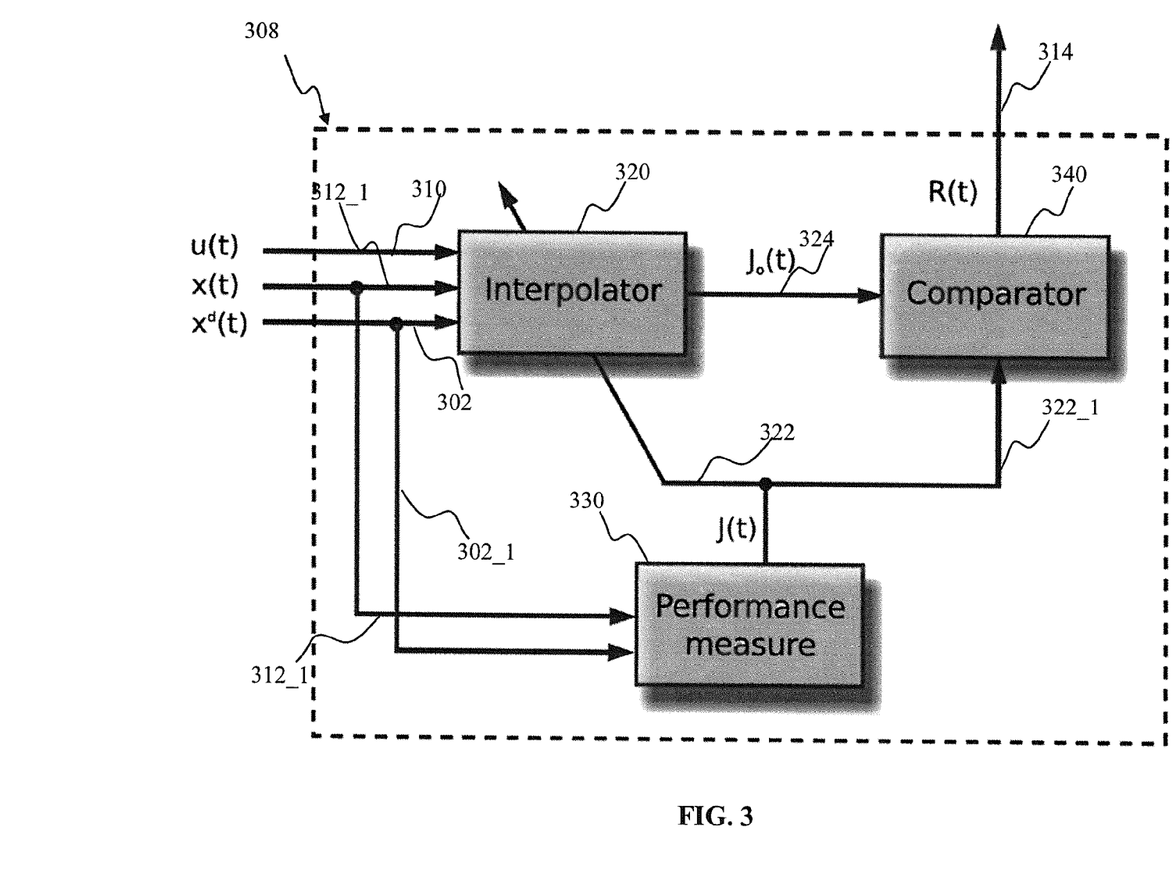
FIG. 3 is a block diagram illustrating one embodiment of an adaptive critic apparatus according to the invention.

FIG. 3 illustrates one embodiment of the critic apparatus (for use in applications such as the critic module 108 of FIG. 1) according to the invention. While described primarily in the context of continuous and/or discrete control apparatus (such as the control apparatus 100 of FIG. 1), the apparatus 308 may be used in any number of other applications or host apparatus, the apparatus of FIG. 1 being merely exemplary.

As shown in FIG. 3, the adaptive critic apparatus 308 (depicted by a dashed rectangle) comprises an interpolator block 320, a performance estimation block 330, and a comparator block 340. The critic 308 is configured to receive the reference input signal $x^d(t)$, corresponding to the desired (predicted or target) plant state, the actual plant state $x(t)$ (or its estimate), and the control signal $u(t)$ (such as for example, currents driving the robot motors, vehicle speed and direction, or heater power and fan speed, etc). Note, that the input signals $x^d(t) = \{x^d_i(t), i=1:N\}$, $x(t) = \{x_i(t), i=1:NN, NN<N\}$, $u(t) = \{u_i(t), i=1:M\}$ comprise multiple components and are typically described using vector quantities.

Although the critic apparatus 308 receives some inputs that are generally similar to the prior art critic apparatus 108 of the adaptive critic designs system of FIG. 1, the critic 308 is structurally different from the prior art (compare the exemplary configuration of FIG. 3 to FIG. 2 and FIG. 2A), and performs different functions as described in detail below.

As shown in FIG. 3, the target state $x^d(t)$ and the output plant state signal $x(t)$ are routed to performance estimation block 330 via the logical pathways 302_1, 312_1, respectively, and to the interpolator block 320 via the logical pathways 302, 312, respectively. In addition, the control signal $u(t)$ is routed to the interpolator block 320 via the logical pathway 310.

The control performance of the control apparatus (e.g., the apparatus 100 of FIG. 1) is typically expressed using a performance measure J(t), which describes an error estimate between the target state $x^d(t)$ and the current plant state $x(t)$ at every time instance. Without loss of generality, it is assumed that the measure J(t) is defined such that the control performance improvement is equivalent to the minimization of J(t) with respect to time. It is also assumed that the current plant state $x(t)$ (or its estimates) are available to the performance measure block 320 at every time instance of the adaptive critic 308 operation.

As shown in FIG. 3, the current estimate of the performance measure J(t) is delivered to the interpolator via the pathway 322.

In one variant, the target state signal $x^d(t)$, the current state signal $x(t)$ and the control signal $u(t)$, together form a context signal $c(t)$ and the performance signal J(t) is expressed as a function of the context signal, as follows:

$$J(t)=J(c(t)), c(t)=[x^d(t)x(t)u(t)]^T \qquad \text{(Eqn. 4)}$$

As discussed in further detail below, the interpolator block 320, in accordance with the received context signal $c(t)$, and the current control performance signal $J(c(t))$, stores information about the present value of $J(c(t))$, and provides a prior performance estimate $J_o(c(t))$ to the comparator block 340 via the pathway 324, as shown in FIG. 3. The prior performance measure value $J_o(c(t))$, stored by the interpolator block 320, corresponds to the control performance value observed (computed) by the performance measurement block 330 for the same context $c(t)$ as the current performance $J(c(t))$, but at certain time instances preceding the current time instance t.

The comparator 340 receives the present performance value $J(c(t))$ and an estimate of the past performance value $J_o(c(t))$, and produces the signal R(t) (also referred to as the reinforcement signal), which is a measure of the distance between both input signals. That is:

$$R(t)=(J(c(t)), J_o(c(t))). \qquad \text{(Eqn. 6)}$$

In one variant, the signal R(t) is defined as a weighted difference between $J(c(t))$ and $J_o(c(t))$, that is:

$$R(t)=\alpha J(c(t))-\beta J_o(c(t)), \qquad \text{(Eqn. 7)}$$

where $\alpha, \beta$ are constants, selected in one variant such that $0 \le \alpha < 1$, $0 \le \beta < 1$.

Interpolator Apparatus

The critic apparatus 308 of the embodiment shown in FIG. 3 advantageously comprises the interpolator block 320, which is configured to, inter alia, store the information related to the past performance of the control apparatus (e.g., the apparatus 100 of FIG. 1). Specifically, the interpolator block 320 stores the past values $J_o(t)$ of the performance measure J for every instance of the context signal $c(t)$. In one variant, the interpolator block 320 is further configured to generalize the acquired knowledge (i.e., the relationship between of the past performance and the context) and to interpolate and/or extrapolate to other context signal instances never seen during the learning phase. One exemplary embodiment of such interpolation is illustrated in FIG. 4.

Figure 4:
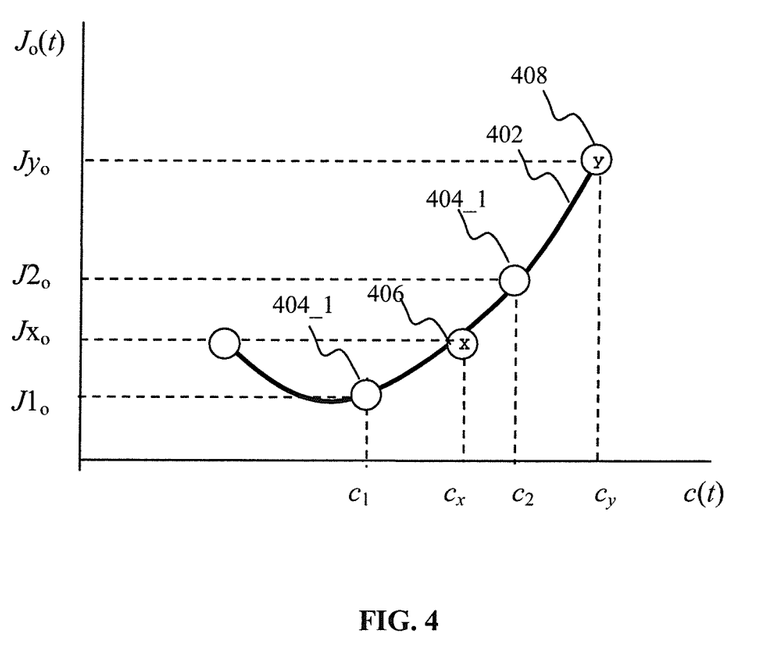
FIG. 4 is a plot illustrating one embodiment of interpolator block operation of the adaptive critic apparatus of FIG. 3 according to the invention.

As shown in FIG. 4, line 402 depicts a control trajectory 402 relating the past performance $J_o(t)$ and the context c(t). Circles labeled 404_1, 404_2 represent instances of past performance J1, J2 computed (and stored by the interpolator) for specific instances of context $c_1$ and $c_2$. The circle 406 labeled with an "x" corresponds to the context configuration $c_x$ that was not previously observed. Hence, the interpolator does not have the corresponding performance measure Jx stored in its storage block. However, upon receiving the context configuration $c_x$ the interpolator determines that the new context $c_x$ is within the range of previously observed contexts (i.e., the range [$c_1, c_2$]). Subsequently, the interpolator determines (interpolates) the past performance measure $Jx_o$ that corresponds to the context $c_x$, even though the context $c_x$ was not previously observed by the interpolator of the adaptive critic apparatus 308.

In a more general sense, the interpolator block 320 implements the following mapping:

$$c(t) \rightarrow J_o(c(t)) \qquad \text{(Eqn. 8)}$$

In one variant, of context of trajectory tracking tasks, at every time instance $t_n$ the mapping associates the present instance of the context vector $c(t_n)$ (comprising, for example, the instantaneous target state value $x^d$ and the current plant state value x taken at the present time $t_n$) with an average tracking error $<J(c(t_k))>$, where the average is calculated over the past instances of the tracking error $J(c(t_k))$ at time instances $t_k$, k=1:K, where $t_k$ are selected such that at $t_k:c(t_k)=c(t_n)$, k=1:K. In other words, the past system performance $J_o(c(t))$ in Eqn. 8. is calculated as the average $<J(c(t_k))>$, where the average is computed over the past values of $J(c(t_k))$ when the present instance of the vector c has been previously observed.

It is appreciated by those skilled in the arts that other statistical functions (e.g., a running mean, a weighted average, a median, etc.) may be used in place of the averaging when computing the mapping of Eqn. 8. It is further appreciated by a skilled practitioner of the arts that averaging time scales (i.e., the number of elements of a running mean) and/or the weighting parameters are determined based on a specific application using any of applicable techniques, such as, for example, least squares fit, minimum mean squared error, median absolute deviation, etc.

In another variant, the past performance measure is computed using an iterative approach. In such implementation, the actual system performance observed in the present trial n is denoted by $J(t)^n$. The expected system performance in the $n^{th}$ trial, denoted by $J_o(t)^n$, is defined an average system performance over the last k trials preceding n. Values of $J_o(t)^n$ are computed using the following iterative procedure:

$$J_o(t)^n = \frac{J(t)^{(n-1)} + kJ_o(t)^{(n-1)}}{k+1}, \text{ where } J_o(t)^1 = J(t)^1. \qquad \text{(Eqn. 9)}$$

Several approaches are used to implement the mapping of Eqn. 8. In one variant of the invention, when the context consists of a finite number of states, the interpolator is implemented as a look-up table (or a similar method). In this variant, each cell i in the look-up table, corresponds to a different context $c_i$, where i=1, 2, . . . is the common label of the context value and the cell. The table is initiated with some values $J_{oi}$. For example, initially all cells in the table may take zero values. Whenever a given context $c_i$ is visited the table outputs a value $J_{oi}$ stored in the $i^{th}$ cell corresponding to $c_i$ and updates the cell based on the observed value of the present performance signal J(t). In one exemplary variant of the invention the cells are updated using the most present values of the performance measure signal J(t) according to the following rule:

$$\text{if } c(t)=c_i(t) \text{ then } J_{oi}=\alpha J_{oi}+\beta J(t), \qquad \text{(Eqn. 9)}$$

where $\alpha, \beta$ are constants, selected in one variant such that $0 \le \alpha < 1$, $0 \le \beta < 1$.

In another variant of the invention, when the context consists of an infinite number of states, the past performance $J_o(c(t))$ is estimated using function approximation methods, for example, using an artificial neural network model trained according to the online supervised learning algorithm, such as e.g. a delta rule or an error back-propagation algorithm as an approximation block (see e.g. Hertz et al., *Introduction to the theory of neural computation*. Westview Press, 1991) aiming at minimizing the difference between the present performance signal J(c(t)) and the approximation output $J_o(c(t))$ (see FIG. 3). Since online approximation methods have a limited convergence speed, the output from the interpolator will follow, but will never (except of, after infinite number of iterations) perfectly be equal to the present value of the performance measure J(c(t)), thus the output $J_o(c(t))$ from the approximation block will represent some history (e.g. a running average) of the past values of J(c(t)), as desired.

Exemplary Critic Method

Figure 5:
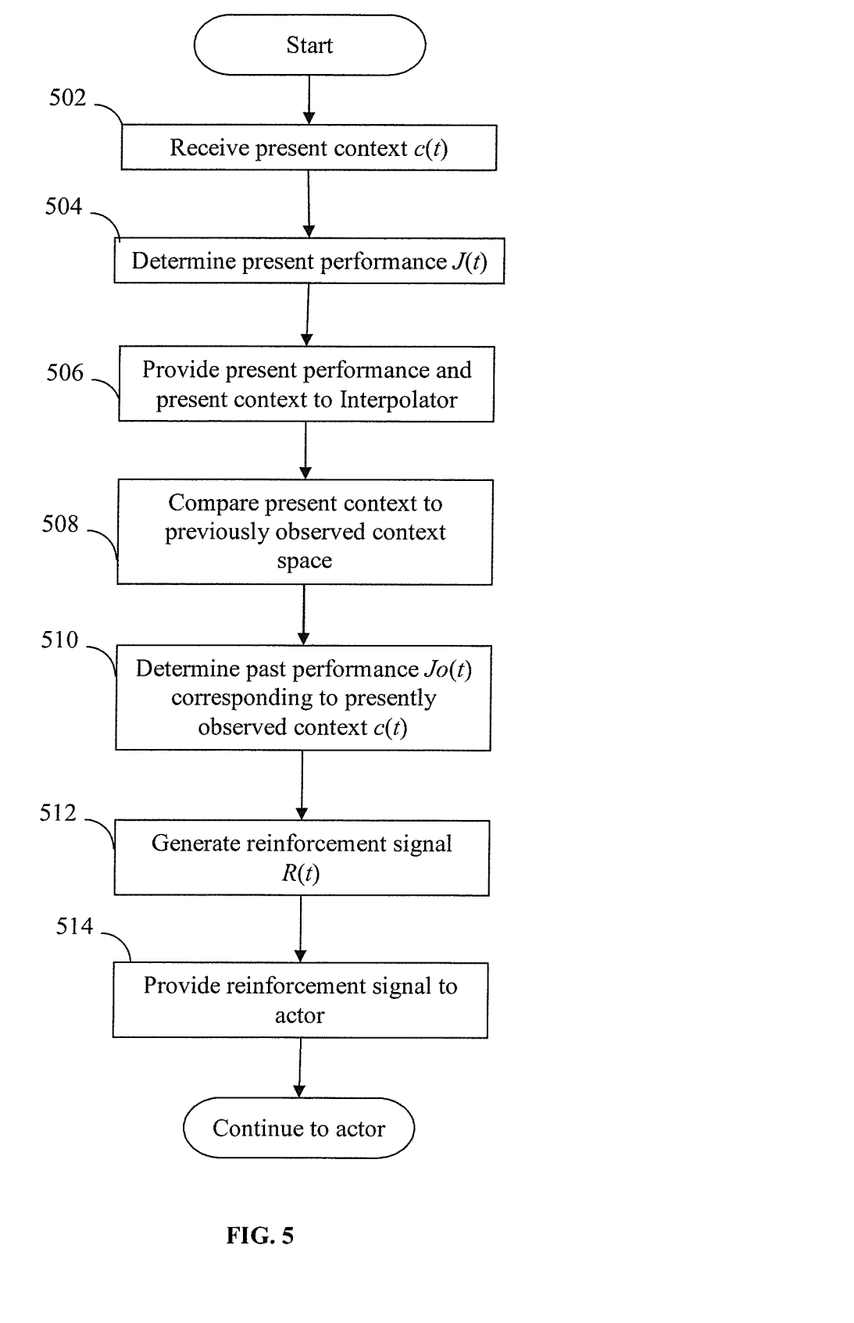
FIG. 5 is a logical flow chart illustrating one embodiment of the method of adaptive critic operation according to the invention.

FIG. 5 illustrates one exemplary method of the adaptive critic operation according to the invention. At step 502, the critic receives the present context value (e.g., the context vector c(t) defined by Eqn. 4) corresponding to the present time t0. Subsequently, at step 504, the critic determines the present value of the performance signal J(t) that corresponds to the present context value c(t)). At step 506, the present performance J(t) and the present context c(t) are provided to the interpolator, which compares at step 508 the present context value c(t) to the context values <c> that were observed previously to time t0 (the observed context space). Based on the evaluation of the observed context space, the interpolator determines at step 510 the value of the past performance Jo(t) that corresponds to the present value of the context c(t) using any of the methodologies described, supra. At step 512 the comparator determines the reinforcement signal R(t) based on the present performance value J(t) and the past performance value Jo(t), and provides the reinforcement signal to the actor block at step 514.

Figure 5A:
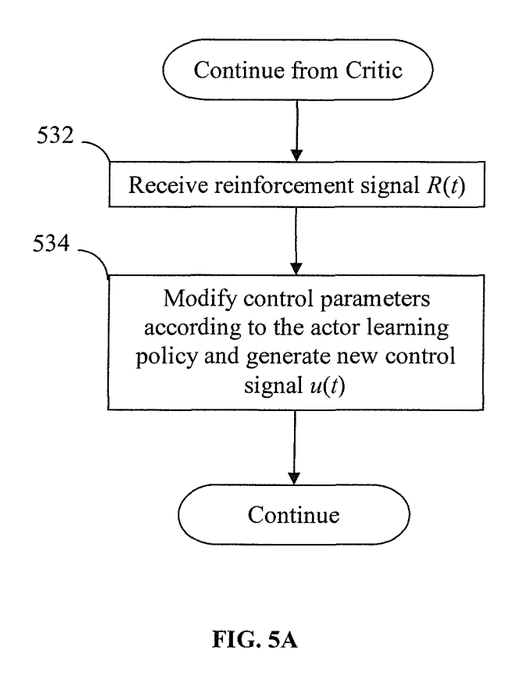
FIG. 5A is a logical flow chart illustrating one embodiment of the method of control apparatus operation according to the invention.

Referring now to FIG. 5A, one exemplary method of the control apparatus operation according to the invention is shown and described. At step 532 the actor block (such as for example the actor 104 of FIG. 1) receives the reinforcement signal R(t) from the comparator (such as for example, the comparator block 340 of FIG. 3) At step 534, the actor uses the reinforcement signal R(t) to modify parameters of the actor module, according to the actor learning policy, thereby generating the new control signal $u^+(t)$, such that to minimizing the performance measure in subsequent iterations of the control apparatus operation.

Exemplary Uses and Applications of Certain Aspects of the Invention

Adaptive critic apparatus and methods of the invention advantageously allow for an improved intelligent controller operation due to, inter alia, the use of past values of controller performance that are previously observed for the present values of the controller input (i.e., the context). The use of past (observed) performance in place of the future (i.e., predicted)

performance is advantageous as it reduces (or altogether eliminates) controller susceptibility to possible model and prediction errors.

In one embodiment, the adaptive critic is implemented as a software library configured to be executed by a in intelligent control apparatus running various control applications. In another embodiment, the adaptive critic comprises a specialized hardware module (e.g., an embedded processor or controller). In another embodiment the adaptive critic apparatus is implemented in a specialized or general purpose integrated circuit, such as, for example ASIC, FPGA, or PLD). Myriad other implementations exist that will be recognized by those of ordinary skill given the present disclosure.

Advantageously, the present invention can be used to simplify and improve control tasks related to trajectory tracking or set-point control in such tasks as painting or welding using robotic devices, stabilization of inherently unstable control objects, such as a Segway®, etc. Embodiments of the present invention are further applicable to a wide assortment of control applications including industrial control, navigation of autonomous vehicles, robotics. Advantageously, exemplary embodiments of the present invention are useful in a variety of devices including without limitation prosthetic devices (such as artificial limbs), industrial control, autonomous and robotic apparatus, HVAC, and other electromechanical devices requiring accurate stabilization, set-point control or trajectory tracking functionality. Examples of such robotic devises are manufacturing robots (e.g., automotive), military devices, and medical devices (e.g. for surgical robots). Examples of autonomous vehicles include rovers, unmanned air vehicles, underwater vehicles, smart appliances (e.g. ROOMBA®), etc. Various other applications exist that will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed:

1. An adaptive apparatus for use in a computerized controller, the computerized controller configured to optimize control of a functional apparatus, the adaptive apparatus comprising:
    a first logic configured to receive at a first time a context value comprising a context vector;
    a second logic configured to determine a value of a performance signal of the computerized controller that corresponds to the first time, the determination based at least in part on the context value; and
    a third logic configured to provide a reinforcement indication adapted to cause a modification of at least one control parameter of the computerized controller, the modification configured to minimize an error value associated with the performance signal;
    wherein:
        the adaptive apparatus is further configured to receive a plant state from a plant block in communication with the adaptive apparatus;
        the adaptive apparatus is further configured to provide the reinforcement indication to an actor block in communication with the adaptive apparatus, the reception of the reinforcement indication configured to cause a modification of at least one control parameter associated with control of the functional apparatus so as to effect optimized control of the functional apparatus;
        the reinforcement indication is determined based at least in part on the value of the performance signal;
        the context value comprises a first value of a reference signal that corresponds to the first time, and a first value of the plant state that corresponds to the first time;
        a past context vector comprises a second value of the reference signal that corresponds to a second time, and a second value of the plant state that corresponds to the second time; and
        a past value of the performance signal that is configured based at least in part on:
            (i) the first value of the plant state being within a first predetermined threshold from the second value of the plant state;
            (ii) the first value of the reference signal being within a second predetermined threshold from the second value of the reference signal;
            (iii) the value of the performance signal; and
            (iv) the past value of the performance signal determined at the second time based at least in part on the second value of the reference signal and the second value of the plant state.

2. The adaptive apparatus of claim 1, wherein the past value of the performance signal is further configured based at least in part on a first value of a control signal, that corresponds to the first time, the first value of the control signal being within a third predetermined threshold from a second value of the control signal that corresponds to the second time; and
    the value of the performance signal is further determined based at least on the second value of the control signal that corresponds to the second time.

3. The adaptive apparatus of claim 2, wherein the third logic comprises a comparator component configured to determine the reinforcement indication based on at least in part on the past value of the performance signal and the value of the performance signal.

4. The adaptive apparatus of claim 3, wherein the reinforcement indication is determined as a weighted difference between the past value of the performance signal and the value of the performance signal.

5. The adaptive apparatus of claim 1, wherein the third logic comprises an interpolator component configured to:
    receive the reference signal, the plant state, and the value of the performance signal; and
    provide the past value of the performance signal;
    wherein:
        the value of the performance signal is associated with the first time instance; and
        the past value of the performance signal is based at least in part on a past control performance, associated with a second time instance, where the second time instance precedes the first time instance.

6. The adaptive apparatus of claim 5, wherein the past value performance value is further based at least in part on (i) a match between a set of values, the set of values comprising the second value of the reference signal that corresponds to the second time instance, and a second value of the plant state signal that corresponds to the second time instance; (ii) and a third value of the performance signal determined by the interpolator block at the second time instance for the set of values.

7. The adaptive apparatus of claim 6, wherein the interpolator block is configured to map (i) the first value of the reference signal and the first value of the plant state signal, where both of the first value of the reference signal and the second value of the plant state signal correspond to the first time instance, with (ii) the past value of the performance signal, using supervised learning.

8. The adaptive apparatus of claim 5, wherein:
the past value of the performance signal is determined as a running mean of a plurality of performance values that correspond to a plurality of time instances, individual time instances of the plurality of time instances preceding the first time instance; and
individual ones of the plurality of performance values being determined based at least in part on a value group comprising the reference signal that corresponds to a respective time interval of the plurality of time instances.

9. The adaptive apparatus of claim 1, wherein the first and second logic comprise a computer readable storage medium having at least one computer program stored thereon, the at least one program being configured to, when executed on a processing device:
perform the reception of the reference signal and the plant state signal; and
provide the reinforcement indication.

10. The adaptive apparatus of claim 1, wherein the first and second logic are comprised, at least in part, of a gate logic of an integrated circuit.

11. The adaptive apparatus of claim 1, wherein the past value of the performance signal is determined based at least in part on a value of the performance signal determined at the second time based on the past context vector.

12. The adaptive apparatus of claim 11, wherein the past value of the performance signal is determined based at least in part on a distance between the context vector and the past context vector being smaller than a predetermined measure.

13. A method of operating a computerized adaptive controller apparatus, the controller apparatus configured to optimize control of a functional apparatus, the method comprising:
receiving at a first time a context value comprising a context vector;
determining a value of a performance signal of the computerized controller that corresponds to the first time, the determination based at least in part on the context value;
determining, based at least in part on the value of the performance signal, a reinforcement indication adapted to cause a modification of at least one control parameter of the computerized controller, the modification configured to minimize an error value associated with the performance signal so as to effect optimized control of the functional apparatus; and
obtaining a state information associated with the functional apparatus;
wherein:
the context vector comprises a first value of a reference signal that corresponds to the first time, and a first value of the state information that corresponds to the first time;
a past context vector comprises a second value of the reference signal that corresponds to a second time, and a second value of the plant state that corresponds to the second time;
the reinforcement indication is determined based at least in part on a past value of the performance signal, the past value associated with the second time preceding the first time;
the past value of the performance signal is determined based at least in part on a match between the context vector and the past context vector corresponding to the second time;
the past value of the performance signal is determined at the second time based at least in part on the second value of the reference signal and the second value of the plant state; and
the value of the performance signal is configured based at least in part on:
(i) the first value of the plant state being within a first predetermined threshold from the second value of the plant state;
(ii) the first value of the reference signal being within a second predetermined threshold from the second value of the reference signal; and
(iii) the value of the performance signal.

14. The method of claim 13, wherein the minimization of the error value is configured to reduce at least one error measure associated with the control of the functional apparatus, relative to the control of the functional apparatus in absence of the reinforcement indication.

15. The method of claim 14, wherein the reference signal comprises a reference plant state.

16. The method of claim 15, wherein:
the performance value comprises a teaching signal configured to effect supervised learning of the interpolator block, the teaching signal being determined based at least in part on a parameterized function of at least one of the reference plant state or the first value of the plant state, the parameterized function characterized by at least one parameter; and
the supervised learning is configured to modify the at least one parameter.

17. The method of claim 16, wherein:
the parameterized function is configured to compute a running mean of a plurality of performance values corresponding to a plurality of time instances, and the at least one parameter comprises a number of performance values of the plurality of the performance values used in computing the running mean; and
each time instance of the plurality of time instances precedes the first time.

18. The method of claim 17, wherein the supervised learning comprises online learning effected during operation of the functional apparatus.

19. An adaptive apparatus for use in a computerized controller, the computerized controller configured to optimize control of a functional apparatus, the adaptive apparatus comprising:
means for receiving at a first time a context value comprising a context vector;
means for determining a value of a performance signal of the computerized controller that corresponds to the first time, based at least in part on the context value; and means for providing a reinforcement indication adapted to cause a modification of at least one control parameter of the computerized controller, the modification configured to minimize an error value associated with the performance signal;

means for providing a plant state to the adaptive apparatus; and means for receiving the reinforcement indication, the means for receiving the reinforcement indication configured to cause modification of at least one control parameter associated with control of the functional apparatus so as to effect optimized control of the functional apparatus;

wherein:
   the reinforcement indication is determined based at least in part on the value of the performance signal;
   the context value comprises a first value of a reference signal that corresponds to the first time, and a first value of the plant state that corresponds to the first time;
   the past context vector comprises a second value of the reference signal that corresponds to a second time, and a second value of the plant state that corresponds to the second time; and    a past value of the performance signal is configured based at least in part on:
     (i) the first value of the plant state being within a first predetermined threshold from the second value of the plant state;
     (ii) the first value of the reference signal being within a second predetermined threshold from the second value of the reference signal;
     (iii) the value of the performance signal; and
     (iv) the past value of the performance signal determined at the second time based at least in part on the second value of the reference signal and the second value of the plant state.

20. The adaptive apparatus of claim 19, wherein:
the past value of the performance signal is further configured based at least in part on a first value of a control signal, that corresponds to the first time, the first value of the control signal being within a third predetermined threshold from a second value of the control signal that corresponds to the second time; and
the means for determining the value of the performance signal are further based at least on the second value of the control signal that corresponds to the second time.

* * * * *